(12) United States Patent
Hearn (10) Patent No.: US 9,049,211 B1
(45) Date of Patent: Jun. 2, 2015

(54) USER CHALLENGE USING GEOGRAPHY OF PREVIOUS LOGIN

(75) Inventor: Mike Hearn, Zurich (CH)

(73) Assignee: Google Inc., Mountain View, CA (US)

( * ) Notice: Subject to any disclaimer, the term of this patent is extended or adjusted under 35 U.S.C. 154(b) by 283 days.

(21) Appl. No.: 13/292,925

(22) Filed: Nov. 9, 2011

(51) Int. Cl.
*H04L 29/06* (2006.01)
*H04L 29/08* (2006.01)
*G06F 21/31* (2013.01)

(52) U.S. Cl.
CPC ............... *H04L 63/107* (2013.01); *H04L 67/18* (2013.01); *H04L 67/22* (2013.01); *G06F 21/31* (2013.01); *G06F 2221/2111* (2013.01); *G06F 21/316* (2013.01)

(58) Field of Classification Search
CPC ....... H04L 63/107; H04L 67/18; H04L 67/22; G06F 21/31; G06F 2221/2111; G06F 21/316
USPC ............................................................ 726/7
See application file for complete search history.

(56) References Cited

U.S. PATENT DOCUMENTS

| | | | |
|---|---|---|---|
| 2005/0159883 A1* | 7/2005 | Humphries et al. | 701/207 |
| 2007/0213032 A1 | 9/2007 | Shuster | |
| 2008/0146193 A1* | 6/2008 | Bentley et al. | 455/411 |
| 2009/0158404 A1* | 6/2009 | Hahn et al. | 726/5 |
| 2010/0199338 A1* | 8/2010 | Craddock et al. | 726/7 |
| 2013/0091452 A1* | 4/2013 | Sorden et al. | 715/771 |
| 2013/0225282 A1* | 8/2013 | Williams et al. | 463/29 |

OTHER PUBLICATIONS

Bill Cheswick, Rethinking Passwords, Nov. 3, 2009, AT&T Labs, pp. 1, 37 and 44-51, downloaded from http://www.cheswick.com/ches/talks/baltimore.pdf on Sep. 26, 2013.*
Rich Gibson and Schuyler Erle, Google Map Hacks, Jan. 2006, O'Reilly Media, Inc., Chapters 1 and 2.*
Langstaff, "Using Location As a Weapon in the Fight Against Card Not Present Fraud", 2010, 3 pages.
Teeghman, "Online Passwords Could Be a Map", Sep. 28, 2010, 2 pages.

* cited by examiner

*Primary Examiner* — Michael Simitoski
*Assistant Examiner* — Gary Lavelle
(74) *Attorney, Agent, or Firm* — Brake Hughes Bellermann LLP (57) ABSTRACT

Methods and apparatus for performing a user challenge are disclosed. An example computer-implemented method includes receiving, at a server, a request, including a set of login credentials, to access an online service of the server and verifying the received credentials. In the event the login credentials are invalid, the request is denied, and, in the event the login credentials are valid, a challenge is provided to a user that provided the login credentials. The challenge includes: requesting that the user identify a geographic location of a previous successful login; receiving a response to the challenge, the response including a user provided geographic location; and determining if the challenge is satisfied by determining if the provided location is within a threshold distance of a previous login location associated with the user credentials. If the challenge is satisfied, the request is granted. If the challenge is not satisfied, the request is denied.

22 Claims, 8 Drawing Sheets

USER CHALLENGE USING GEOGRAPHY OF PREVIOUS LOGIN

TECHNICAL FIELD

This document relates, generally, to challenging a user login using geography information associated with previous user logins.

BACKGROUND

As part of the rapid growth of Internet and World Wide Web use, there has been an ever increasing growth in the availability of online services. Such online services include, for example, online banking and financial services, online email services, online retail services, online dating services and online social networks. A given online service provider may provide a number of such services, which users of the online services typically access using a username and password, or other user login credentials that may be used by a provider as a mechanism for verifying users of the provider's services.

Accessing online services using such login credentials is, however, subject to fraud and abuse. For example, malicious actors may obtain user login credentials using improper means. Such improper means may include the use of malicious software, such as could be installed on publicly available computers (e.g., in libraries, Internet cafes or other locations), to monitor keystrokes on an affected computer to capture users' login credentials. User credentials could also be improperly obtained using brute force attacks by trying various combinations of usernames and passwords through an automated trial and error process. These techniques for improperly obtaining login credentials are provided by way of example and a number of other approaches for improperly obtaining user credentials may be used. For example, login credentials may be improperly obtained from a user through a process referred to as phishing. Phishing may be accomplished by malicious actors that masquerade as a trustworthy entity (e.g., a bank or credit card company) by sending, for example, a fraudulent email message that appears to be from a trustworthy entity. These phishing messages may include a request that deceives a user into providing login credential information to a malicious actor.

Once a malicious actor has acquired a user's login credentials for a given online service provider, the malicious actor may then gain access to the user's account with that provider. Depending on the specific provider and online services provided by that provider, the malicious actor could then make fraudulent purchases using the user's financial information, gain access to the user's bank accounts, or perform other acts of identity fraud, posing as the legitimate user for whom the malicious actor has obtained login credentials.

SUMMARY

In a first general aspect, a computer-implemented method includes receiving, at a server, a request to access an online service provided by the server, the request including a set of login credentials. The computer-implemented method also includes verifying whether the login credentials are valid or invalid. In the event the login credentials are invalid, the computer-implemented method includes denying the request. In the event the login credentials are valid, the computer-implemented method includes performing a user challenge, where performing the user challenge includes providing a challenge to a user that provided the login credentials, the challenge requesting that the user identify a geographic location of a previous successful login associated with the user credentials. Providing the user challenge further includes receiving a response to the challenge, the response including a user provided geographic location. Providing the user challenge still further includes determining if the challenge is satisfied by determining if the provided geographic location is within a threshold distance of a geographic location of a previous successful login associated with the user credentials. If the challenge is satisfied, the computer-implemented method includes granting the request. If the challenge is not satisfied, the computer-implemented method includes denying the request.

Implementations may include one or more of the following features. For example, providing the challenge may include providing a graphical user interface (GUI) including a map image, the graphical user interface being configured to allow the user to reposition and resize the map image. Receiving the response may include receiving an indication of map image boundaries selected by the user in response to the challenge. Determining if the provided geographic location is within the threshold distance of the geographic location of the previous successful login may include determining if a map center point corresponding with the received map image boundaries is within the threshold distance of the geographic location of the previous successful login.

Determining if the challenge is satisfied may include determining if an area defined by the map image boundaries is below a threshold size. The GUI may be configured to allow the user to reposition the map image by providing at least one of an address, a city name, a state name, a province name, a country name and a landmark name. The GUI may be configured to receive the at least one of an address, a city name, a state name, a province name, a country name and a landmark name as text input.

The GUI may be configured to allow the user to identify the user provided geographic location by placing a marker on the map image. The GUI may be configured to reposition the map image using the marker as a center point. The GUI may be configured to allow the user to move the marker after placing the marker on the map image. The GUI may be configured to allow the user to resize the map image by zooming-in on the map image and zooming-out on the map image.

Providing the challenge may include providing a GUI including a map image, where the GUI is configured to allow the user to reposition and resize the map image. Receiving the response may include receiving an indication of map image boundaries selected by the user in response to the challenge. Determining if the provided geographic location is within the threshold distance may include determining if the received map image boundaries are below a threshold size and determining if the geographic location of the previous successful login is within the received map image boundaries.

The threshold distance may depend on the geographic location of the previous successful login. Requesting that the user identify the geographic location of the previous successful login may include requesting that the user identify a geographic location of a last successful login. Requesting that the user identify the geographic location of the previous successful login may include requesting that the user identify one of a predetermined number of previous successful login attempts, where the predetermined number is greater than one. The server may be configured to determine geographic locations based on Internet Protocol (IP) geocoding.

In another general aspect, a computer-implemented method includes receiving, at a server, a request to access an online service provided by the server, the request including a set of valid login credentials. The computer-implemented method also includes performing, by the server, a risk assessment analysis of the request, the risk assessment analysis including determining if the request has one or more attributes indicating the request is potentially fraudulent. If the risk assessment analysis determines that the request does not include one or more attributes indicating the request is potentially fraudulent, the computer-implemented method includes granting the request.

If the risk assessment analysis determines that the request does include one or more attributes indicating the request is potentially fraudulent, the computer-implemented includes performing a user challenge, where performing the challenge includes providing a challenge to a user that provided the login credentials, the challenge requesting that the user identify a geographic location of a previous successful login associated with the user credentials. Performing the challenge further includes receiving a response to the challenge, where the response includes a user provided geographic location. Performing the challenge still further includes determining if the challenge is satisfied by determining if the provided geographic location is within a threshold distance of a geographic location of a previous successful login associated with the user credentials. If the challenge is satisfied, the computer-implemented method includes granting the request. If the challenge is not satisfied, the computer-implemented method includes denying the request.

Implementations may include one or more of the following features. For example, the risk assessment analysis may be based on at least one of an Internet Protocol (IP) address associated with the request and a geographic location associated with the request. The risk assessment may be based on a distance between the geographic location associated with the request, a geographic location of a last successful login associated with the user credentials, and/or an elapsed time between the request and the last successful login. The geographic location of the request and the geographic location of the last successful login attempt may be determined using Internet Protocol geocoding. Requesting that the user identify the geographic location of the previous successful login may include requesting that the user identify one of a predetermined number of previous successful login attempts, the predetermined number being greater than one.

In another general aspect, a non-transitory computer-readable medium has recorded and stored thereon instructions that, when executed by a computing device, cause the computing device to perform the action of receiving, at a server, a request to access an online service provided by the server, the request including a set of login credentials. The instructions, when executed by the computing device, cause the computing device to perform the action of verifying whether the login credentials are valid or invalid. In the event the login credentials are invalid, the instructions, when executed by the computing device, cause the computing to deny the request. In the event the login credentials are valid, the instructions, when executed by the computing device, cause the computing to perform a user challenge, where performing the user challenge includes providing a challenge to a user that provided the login credentials, the challenge requesting that the user identify a geographic location of a previous successful login associated with the user credentials. Performing the user challenge further includes receiving a response to the challenge, the response including a user provided geographic location. Performing the user challenge still further includes determining if the challenge is satisfied by determining if the provided geographic location is within a threshold distance of a geographic location of a previous successful login associated with the user credentials. If the challenge is satisfied, the instructions, when executed by the computing device, cause the computing to grant the request. If the challenge is not satisfied, the instructions, when executed by the computing device, cause the computing to deny the request.

In another general aspect, a non-transitory computer-readable medium having recorded and stored thereon instructions that, when executed by a computing device, cause the computing device to perform the action of receiving, at a server, a request to access an online service provided by the server, the request including a set of valid login credentials. The instructions, when executed by the computing device, cause the computing device to perform the action of performing, by the server, a risk assessment analysis of the request, the risk assessment analysis including determining if the request has one or more attributes indicating the request is potentially fraudulent. If the risk assessment analysis determines that the request does not include one or more attributes indicating the request is potentially fraudulent, the instructions, when executed by the computing device, cause the computing device to grant the request. If the risk assessment analysis determines that the request does include one or more attributes indicating the request is potentially fraudulent, the instructions, when executed by the computing device, cause the computing device to perform a user challenge. Performing the user challenge includes providing a challenge to a user that provided the login credentials, the challenge requesting that the user identify a geographic location of a previous successful login associated with the user credentials. Performing the user challenge further includes receiving a response to the challenge, the response including a user provided geographic location. Performing the user challenge still further includes determining if the challenge is satisfied by determining if the provided geographic location is within a threshold distance of a geographic location of a previous successful login associated with the user credentials. If the challenge is satisfied, the instructions, when executed by the computing device, cause the computing device to grant the request. If the challenge is not satisfied, the instructions, when executed by the computing device, cause the computing device to deny the request.

DETAILED DESCRIPTION

Figure 1:
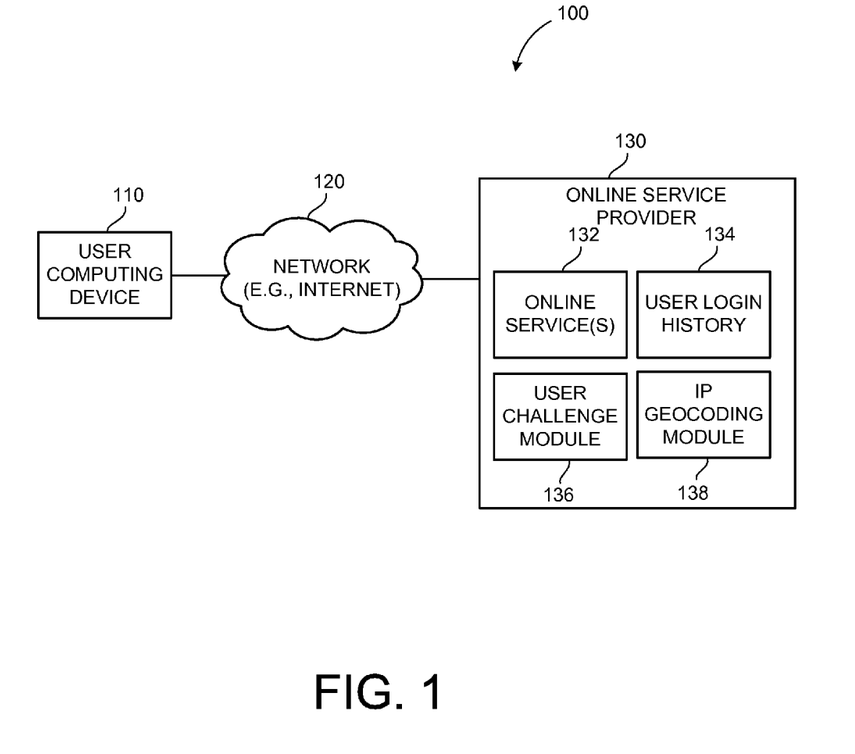
FIG. 1 is a block diagram illustrating a computing network in accordance with an example embodiment.

FIG. 1 is a block diagram illustrating a computing network 100 in accordance with an example embodiment. The computing network 100 includes a user computing device 110, a data network 120 (e.g., the Internet) and an online service provider 130. The computing network 100 may be used to implement the techniques described herein, such as by performing user challenges that request users to provide/identify geographic locations of previous successful logins. For instance, a geographic location of a last successful login for a given user may be used as the basis of such a challenge or, alternatively, respective geographic locations of a given number of previously successful login may be used, where the number of previous, successful logins that may serve as the basis of such a challenge is greater than one. In such an approach, a user providing a response that is consistent with any of the respective geographic locations of the given number of previous, successful logins may result in the challenge being satisfied.

In one example, which may be implemented using the computing network 100, the user computing device 110 may be used to send a request (via the network 120) to the online service provider 130. Such a request may include a set of login credentials, as well as being a request to access one or more of the online services 132 included in (provided by) the online service provider 130. The online service provider 130 may be configured to verify whether the received login credentials included in such a request are valid. For instance, the received login credentials may include a username and password, which the online service provider 130 may compare with a database of valid login credentials (not shown) to determine whether the username/password pair (login credentials) match an entry in its database. If a match is found, the online service provider 130 may consider user credentials as being valid.

As was discussed above, malicious actors may obtain valid login credentials using a number of approaches. In order to prevent fraudulent activities of such malicious actors, online service provider 130 may be further configured to perform additional verification operations, such as by using the techniques described herein, in order to increase confidence that received, valid login credentials (e.g., that match an entry in a database valid login credentials) that have been provided to the online service provider 130, have been received from legitimate users (e.g., the respective user associated with the received, valid login credentials).

In an example embodiment, which may be implemented in the computing network 100 shown in FIG. 1, the online service provider 130 may be configured to implement such a user challenge using a user login history 134, a user challenge module 136 and an Internet Protocol (IP) geocoding module 138. In such an approach, the user login history 134 may include a database of information related to successful logins by legitimate, registered users of the online services 132 of the online service provider 130. It will be appreciated, that the user login history 134 may also include information regarding unsuccessful login attempts that are received by the online service provider. Such unsuccessful login attempts may be associated with legitimate, registered usernames or, alternatively, may be unsuccessful login attempts that are not associated with legitimate, registered usernames, such as may occur as a result of malicious actors attempting to improperly obtain valid login credentials.

In the online service provider 130, the user login history 134 may also include respective geographic locations associated with each successful login for a given set of login credentials. While other approaches are possible, the IP geocoding module 138 may be used to provide such geographic location information. For instance, the IP geocoding module 138 may be used to determine such geographic locations based on IP addresses that are associated with login requests received at the online service provider 130. Such IP geocoding may be used to determine approximate geographic locations associated with specific IP addresses using publicly available geolocation information for registered Internet addresses. Accordingly, IP geocoding module 138 may be used in the online service provider 130 to determine approximate geographic locations for successful logins, where that geographic location information may then be included in the user login history 134. Also, the IP geocoding module 138 may be used to determine approximate geographic locations of requests (e.g., login request) for access to the online services 132 provided by the online service provider 130. Using the techniques described herein, the geographic location information determined by the IP geocoding module 138 may be used in implementing user verification challenges.

In the computing network 100, the user challenge module 136 of the online service provider 130 may be configured to operate in conjunction with the user login history 134 and the IP geocoding module 138 to conduct user challenges that request a user identify a geographic location of a previous successful login that was accomplished using login credentials associated with the legitimate user, such as using the techniques described herein. For example, the user challenge module 136 may be configured to provide, in response to a login request from the user computing device 110, a graphical user interface (GUI) for implementing such a user challenge on the computing device 110.

FIGS. 2A-2D are diagrams illustrating various views of a user challenge GUI 200 that may be used to implement a user challenge in accordance with example embodiments, such as using the techniques described herein. As indicated above, the online service provider 130 may provide such a user challenge GUI to the user computing device 110 (via the data network 120) in response to a request from the user computing device 110 to access the online services 132 provided by the online service provider 130. Accordingly, for purposes of illustration, the user challenge GUI 200 of FIGS. 2A-2D will be described with further reference to FIG. 1.

The various views of the user challenge GUI 200 shown in FIGS. 2A-2D are given by way of example and other approaches are, of course, possible. In the various views of the user challenge GUI 200 shown in FIGS. 2A-2D, common elements are referenced with like reference numerals. For purposes of brevity and clarity, these like elements are not described in detail with reference to each of FIGS. 2A-2D.

Figure 2A:
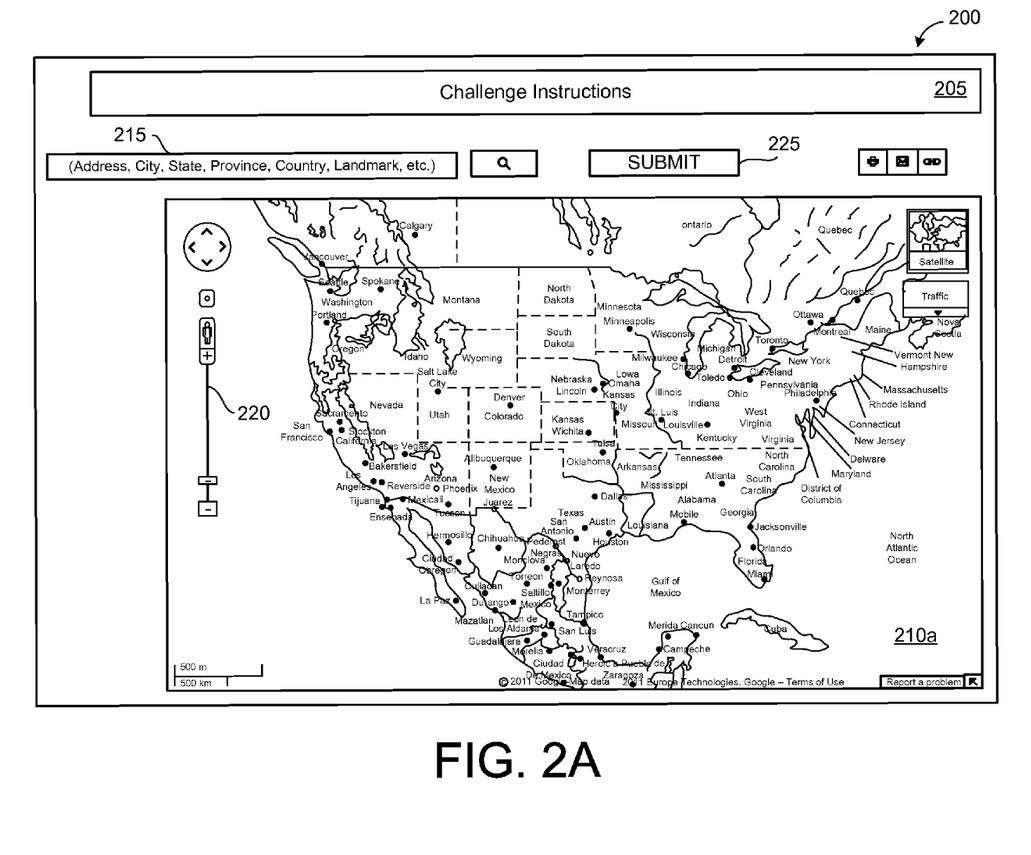
FIGS. 2A-2D are diagrams illustrating graphical user interfaces that may be to implement a user challenge in accordance with example embodiments.

Referring first to FIG. 2A, the user challenge GUI 200 includes challenge instructions 205, a map view 210a, a text entry box 215, a zoom control 220 and a submit button 225. The specific information included in the challenge instructions 205 may depend, at least in part, on the specific embodiment. For example the challenge instructions 205 may instruct a user of the computing system 110 to identify, using the various elements of the user challenge GUI 200, a geographic location of a previous successful login (e.g., using the same user credentials included in a request to access the online services 132). In such an approach, the challenge instructions 205 may request that the user identify a geographic location of a last successful login (corresponding with provided user credentials), or may request that the user identify a respective geographic location for one of a given number of previous successful logins, with the given number being greater than zero.

Figure 2B:
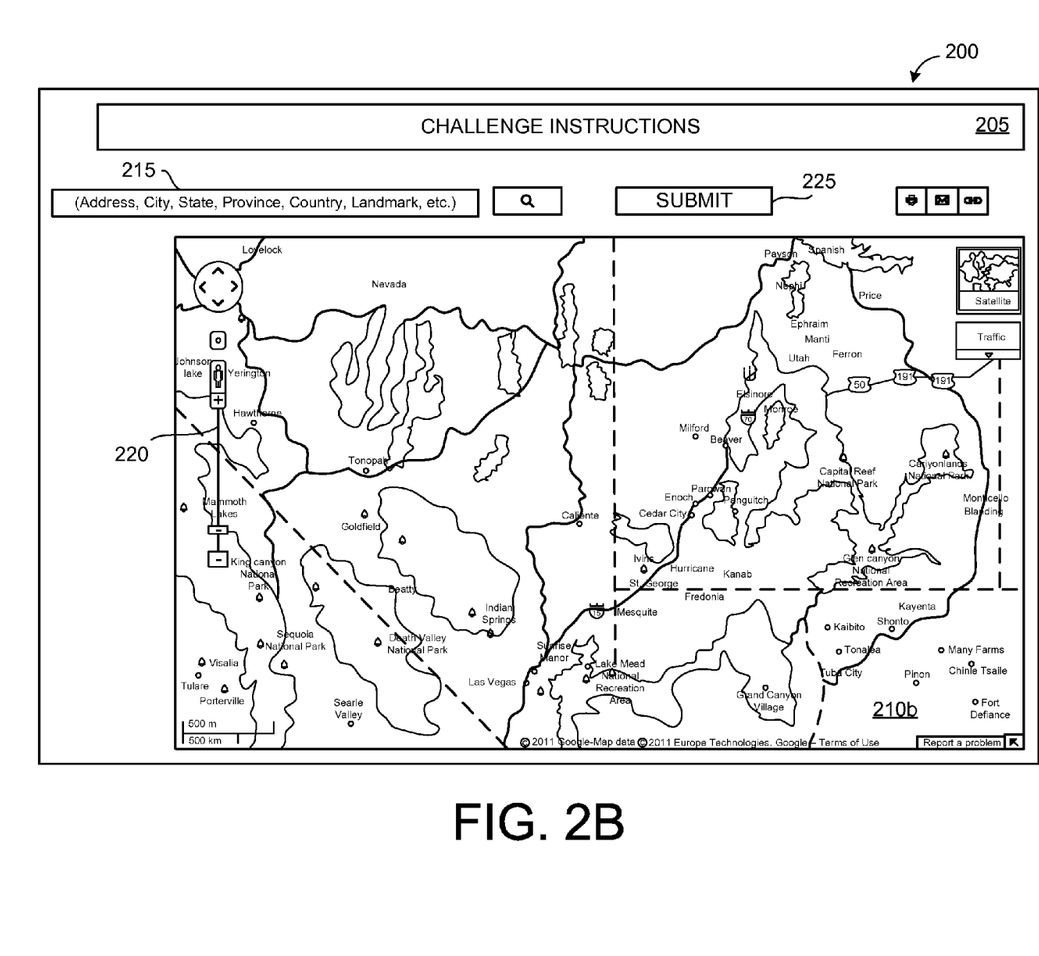

Further the challenge instructions 205 may include information/instructions regarding the use of other elements of the user challenge GUI 200 for identifying a requested geographic location. For example, the challenge instructions 205 may include instructions on repositioning the map view 210a, such as by clicking on the map view 210a and then sliding the map view using a pointing device of the user computing device 110. The challenge instructions 205 may further include instructions on resizing the map image 210a by using the zoom control 220. For example, the zoom control 220, as shown in FIGS. 2A-2D, includes a slide control that may be clicked on (e.g., using a pointing device) and slid up and down (e.g., "clicked and dragged") to respectively zoom-in and zoom-out the map image 210*a*. FIG. 2B illustrates an example of the user challenge GUI 200 with the map image 210*a* resized and repositioned (as map image 210*b* in FIG. 2B), which may be accomplished using the techniques described above or a number of other appropriate techniques.

Figure 2C:
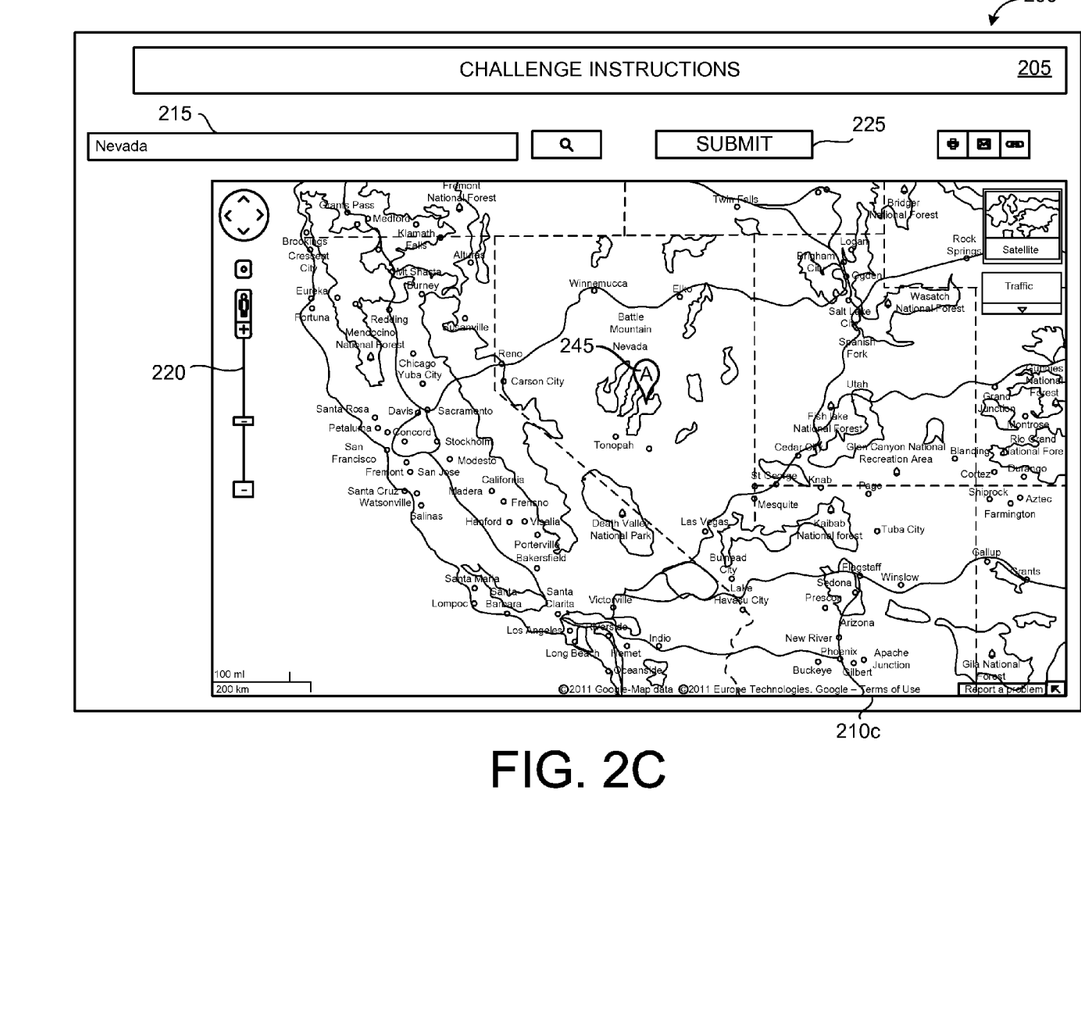

The challenge instructions 205 may also include instructions on repositioning the map view 210*a* using the text entry box 215. In such an approach, a user may enter text indicating one or more of a city name, a state name, a province name, a country name and a landmark name or other information using the text entry box 215. Such text may be entered using a number of appropriate techniques, such as using a keyboard or voice recognition software, as two examples. In this example embodiment, the user challenge GUI 200 may be configured to use such information that is entered in text entry box 215 and then used to zoom-in and/or reposition the map image in response to the user clicking a "search" button, such as the magnifying glass button of the user challenge GUI 200. An example of repositioning the map image 210*a* using such a technique is illustrated in FIG. 2C and discussed below.

Still further, the challenge instructions 205 of the user challenge GUI 200 may include information regarding threshold criteria that may be used by the online service provider 130 when determining whether or not a user challenge that is presented using the user challenge GUI 200 is satisfied. For instance, such threshold criteria may include a threshold distance, where the user must position the center of the map image 210*a* within the threshold distance of a geographic location of a previous successful login in order to satisfy the user challenge.

Such threshold criteria may also include a threshold map image size, where the user must resize the map image to be equal to or less than the threshold size. In other embodiments, the online service provider 130 may determine if the user challenge presented by the user challenge GUI 200 is satisfied based on whether a properly sized map view contains a geographic location of a previous successful login corresponding with the login credentials that are being challenged.

In some embodiments, the challenge instructions 205 may be dynamic and provide a user that is presented with the user challenge GUI 200 an indication of whether the size of a resized map image is within a threshold size or not. Such a determination may be made based on area represented by the map image or by respective distances corresponding with the borders (boundaries) of the map image. It will be appreciated that providing users with an indication of whether a map image threshold size is met does not reduce the efficacy of a user challenge implemented using the techniques described herein, because this indication of map image threshold size does not provide information regarding the geographic locations of previously successful logins, only an indication if the map image is properly sized. Using such an approach, users presented with the user challenge GUI 200 may readily determine when they have properly sized the map image 210*a*.

Using the user challenge GUI 200, once a user has resized and repositioned the map image in accordance with the challenge instructions 205, the user may submit his/her challenge response by pressing the submit button 235. In an example embodiment, the user challenge GUI 200 may be configured to send information about the resized and repositioned map image to the online service provider 130 in response to the user challenge that was presented using the user challenge GUI 200. For instance, the user challenge GUI 200 may be configured to send information regarding a center point of the map image and/or boundary information of the map image to the online service provider 130. The user challenge module 136 of the online service provider 130 may be configured to receive this information and determine, based on the received information, whether the user challenge is satisfied by comparing the received information with information regarding geographic locations of previous successful logins included in the user login history 134, such as in the fashions described herein.

Referring now to FIG. 2B, an alternative view of the user challenge interface 200 is shown with a map image 210*b*. In FIG. 2B, the map image 210*b* illustrates a map view that may be obtained using one or more of the techniques described above. For instance, the map image 210*b* may be obtained by zooming-in on, and repositioning the map view illustrated by the map image 210*a* in FIG. 2A. In this example, a user may zoom-in on the map of the continental United States shown in the map image 210*a* and also reposition the map view to obtain the map image 210*b*, e.g., showing Nevada and Utah. Alternatively, a similar map view (e.g., map image 210*c*) to the map image 210*a* may be obtained using the technique illustrated in FIG. 2C.

In FIG. 2C, a user may enter "nevada" in text entry box 215 of the user challenge GUI 200, then click the search button, such as was previously described. The user challenge GUI 200 may then be configured to automatically zoom-in and reposition the map view of the user challenge GUI 200 to display the map image 210*c* (e.g., showing Nevada and Utah). As is also shown in FIG. 2C, the user challenge GUI 200 may also be configured to add a marker 245 to the map image 210*c* in correspondence with the text entered in text entry box 215. In certain embodiments, the map image 210*c* may be centered at the marker 245.

Figure 2D:
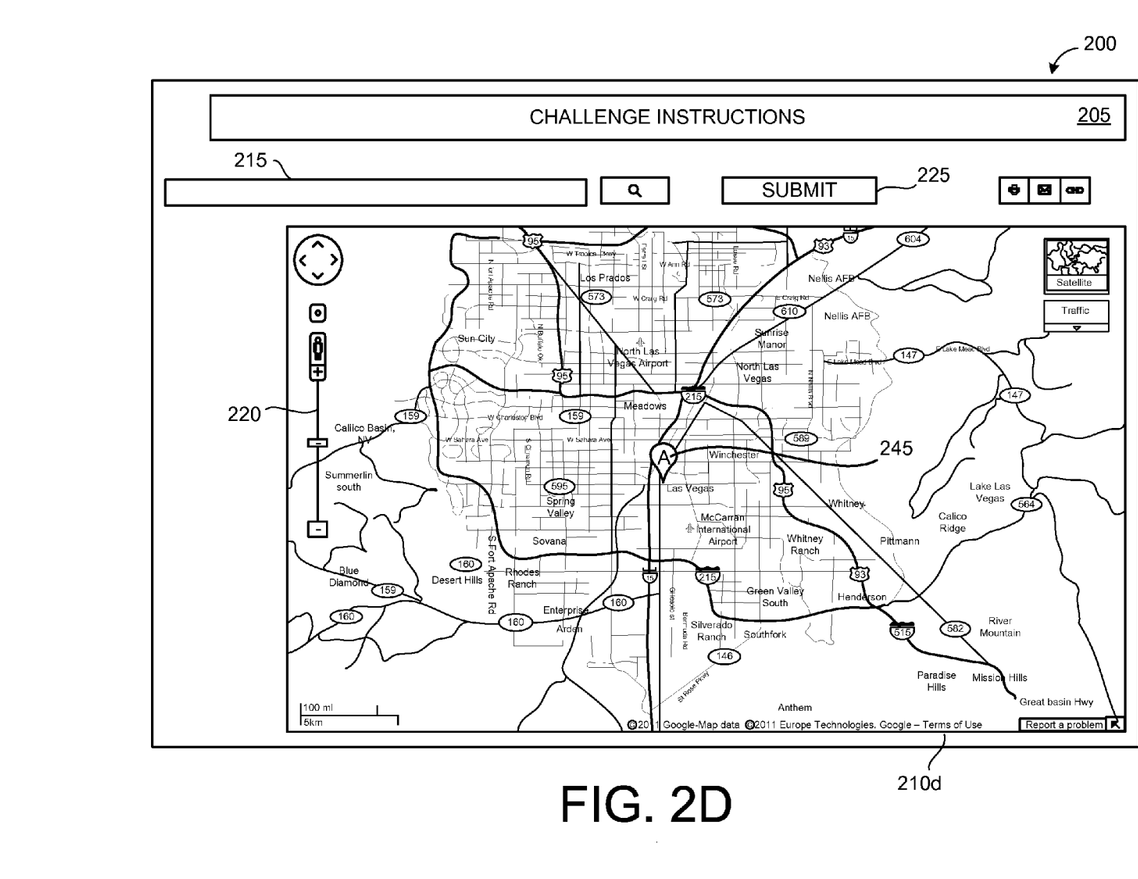

Referring now to FIG. 2D, a map image 210*d* is shown. The map image 210*d* may be obtained in the user challenge GUI 200 by using one or more of the techniques discussed above, or may be obtained using a number of other appropriate techniques. Additionally, the user challenge GUI 200 may be configured to allow a user to manually place, and move (after initial placement) the marker 245 on the map image 210*d* in order to designate a geographic location, such as requested by the challenge instructions 205 of the user challenge GUI 200.

In the example shown in FIG. 2D, if the user requesting access to the online services 132 of the online service provider 130 previously logged in from the Las Vegas strip, the user may submit the map image 210*d* (e.g., map information, as previously described) in response to the user challenge presented by the user challenge GUI 200 by clicking the submit button 225. As previously described, the user challenge GUI 200 may then send appropriate information regarding the map image 210*d* to the online service provider 130. The online service provider 130, e.g., using the user challenge module 136, may then determine whether the user challenge is satisfied based on the received map image information, such as using the techniques described herein. For instance, the online service provider 130 may determine whether the map image 210*d* is within a threshold size and/or whether the marker 245 is within a threshold distance of a geographic location of a previous successful login.

Figure 3:
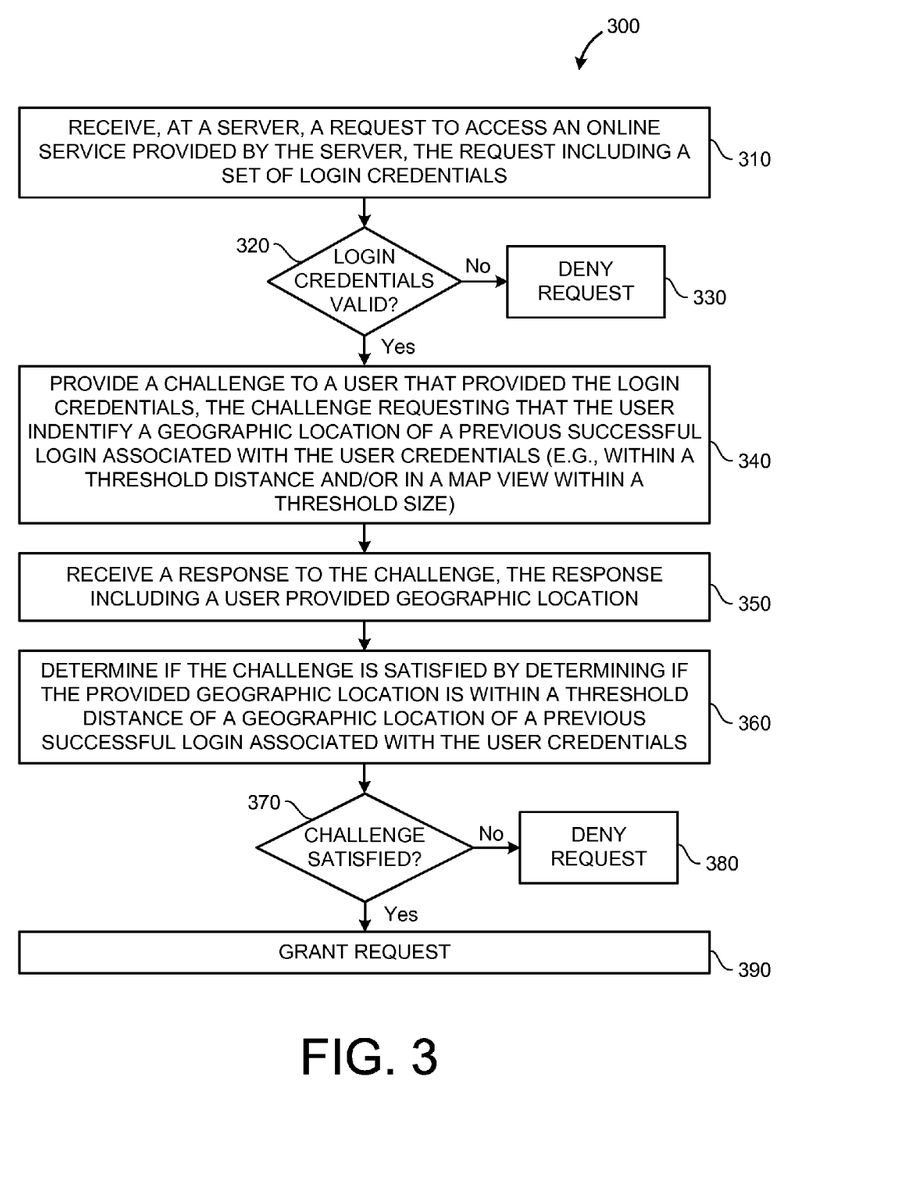
FIG. 3 is a flowchart illustrating a method for performing a user challenge in accordance with an example embodiment.

FIG. 3 is a flowchart illustrating a method 300 and for performing a user challenge in accordance with an example embodiment. The method 300 may be implemented in the computing network 100, as illustrated in FIG. 1 and may also be implemented using the user challenge GUI 200 illustrated in FIGS. 2A-2D, though other arrangements are possible.

However, for purposes of illustration, the method 300 will be described with further reference to FIG. 1 and FIGS. 2A-2D, as appropriate.

As shown in FIG. 3, the method 300 includes, at block 310, receiving, at a server (such as the online service provider 130), a request to access an online service provided by the server, such as the online services 132. The request at block 310 may include a set of login credentials, such as previously described. At block 320, the method 300 includes determining whether the received login credentials are valid or not. As was discussed above, the online service provider 130 may be configured to compare received login credentials with a database of valid login rentals to determine whether a received set of login credentials is valid. If it is determined, at block 320, that the received login credentials are not valid, the method 300 may proceed to block 330, and the request to access the online services may be denied.

If, at block 320, it is determined that the login credentials received at block 310 are valid, the method may proceed to block 340. At block 340, the method 300 includes providing a challenge to a user that provided the login credentials at block 310. Presenting the challenge at block 340 may include sending the user challenge GUI 200 from the online service provider 132 the user computing device 110, as has been discussed herein. In the method 300, the challenge of block 340 may include a request that a user identify a geographic location of a previous successful login associated with the user credentials provided at block 310, such as in the fashions described herein.

At block 350, the method 300 includes receiving a response to the user challenge provided at block 340, where the response includes a user provided geographic location. The response received at block 350 may be generated, for example, by the user challenge GUI 200 on the user computing device 100, such as in the manners described above.

At block 360, the method 300 may include determining, by the online service provider 130, if the user challenge proved at block 340 has been satisfied, where the determination at block 360 is made based on the response received at block 350. For instance, at block 360, the online service provider 130 may determine whether the user provided geographic location of block 350 (which may be in the form of a map image or map image information, as discussed above) meets one or more threshold criteria of the user challenge, such as the threshold criteria discussed above with respect to FIGS. 2A-2D.

For example, at block 360, the user challenge module 136 of the online service provider 130 may determine whether the user provided geographic location of block 350 is within a threshold distance of a geographic location of a previous successful login and/or whether map boundaries included in the response of block 350 are within a threshold size, where indications of the threshold distance and the threshold size may be included in the challenge instructions 205 of the user challenge GUI 200 when using such an approach.

The thresholds of the user challenge of block 340 may depend on a number of factors. For instance, a threshold distance and a threshold size may depend, in part, on the specific geographic location of a previous successful login. Such an approach may be used to account for differences in accuracy of IP geocoding data that is available in different areas. For instance, IP geocoding data tends to be more accurate in developed areas and countries and less accurate in developing and less-developed areas. Using such an approach, allows for the user challenge module 136 to account for the accuracy of IP geocoding data associated with a specific geography and adjust the thresholds of the user challenge accordingly.

At block 370, if the user challenge is not satisfied, the method 300 may proceed to block 380 and the request of block 310 may be denied. If however, at block 370, the challenge is satisfied, the method 300 may proceed to block 390 and the request of block 310 may be granted.

Figure 4:
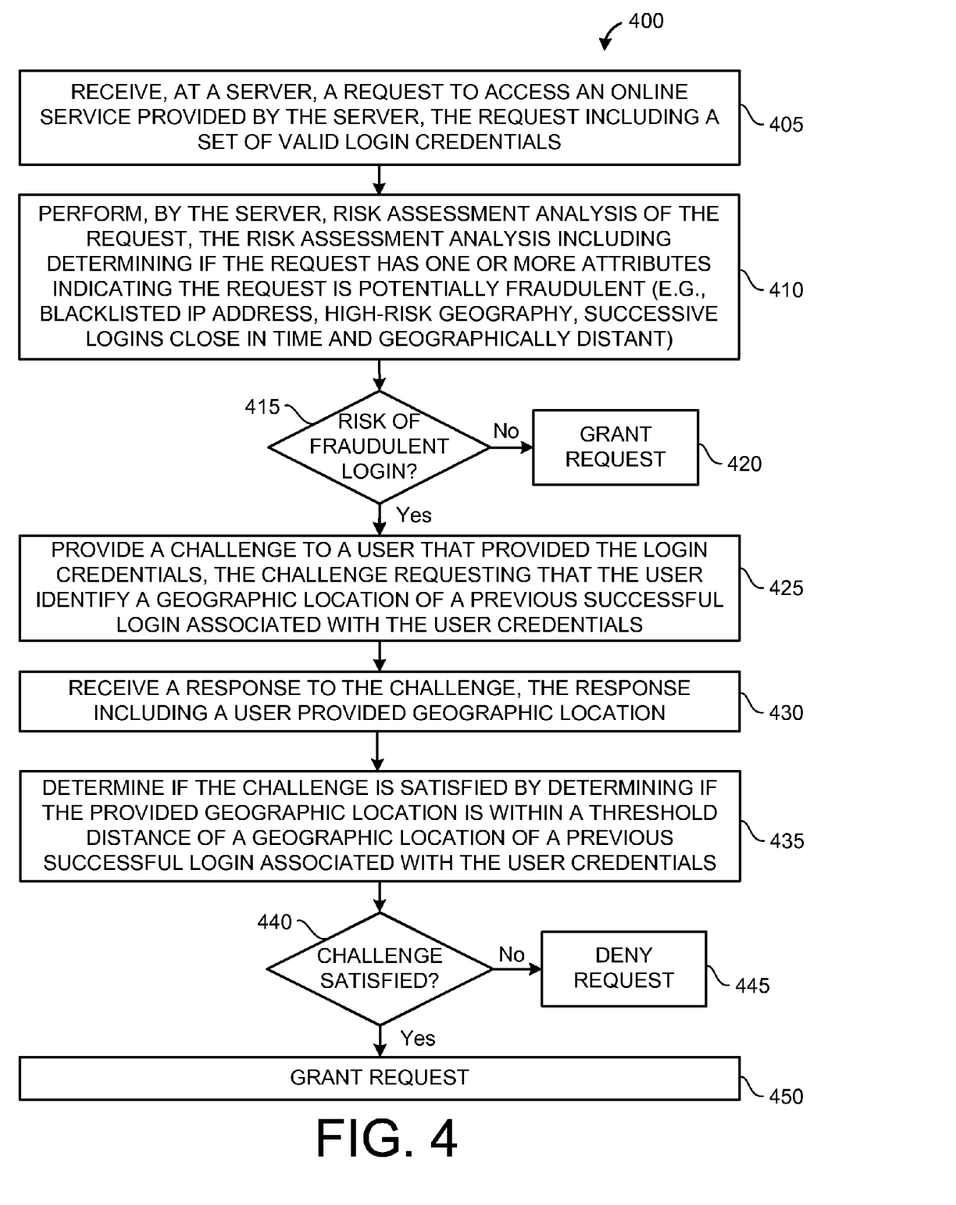
FIG. 4 is a flowchart illustrating a method for performing a user challenge in accordance with another example embodiment.

FIG. 4 is a flowchart illustrating a method 400 for performing a user challenge in accordance with another example embodiment. As with the method 300, the method 400 may be implemented in the computing network 100 illustrated in FIG. 1 and, further, may also be implemented using the user challenge GUI 200 illustrated in FIGS. 2A-2D, though other arrangements are possible. However, for purposes of illustration, the method 400 will be described with further reference to FIG. 1 and FIGS. 2A-2D, as appropriate.

As shown in FIG. 4, the method 400 includes, at block 405, receiving, at a server, such as the online service provider 130, a request to access an online service provided by the server, where the request includes a set of valid login credentials. The online service provider 130 may determine that a received set of login credentials is valid using the techniques described herein, such as by comparing the received login credentials with a database of valid login credentials. In like fashion as the method 300, if the online service provider receives an invalid set of login credentials, the online service provider 130 may deny an associated request to access an online service 132 provided by the online service provider 130.

At block 410, the method 400 includes performing, by the server, a risk assessment analysis of the request of block 405, where the risk assessment analysis includes determining if the request of block 405 has one or more attributes indicating that the request may be potentially fraudulent. A number of approaches may be used to perform such a risk assessment analysis, and such an analysis may be based on a number of different factors.

For example, the online service provider 130 may maintain a list of black-listed IP addresses. IP addresses included in such a black-list may be IP addresses that are known to be associated with previous fraudulent activity, such as IP addresses in Internet cafes', for example. Such a blacklist may include individual IP addresses and/or may include ranges of IP address, such as IP addresses corresponding with a specific subnet, for example. If the request received at block 405 corresponds (is received from) a black-listed IP, the risk assessment analysis at block 410 may indicate that that request is potentially fraudulent and that a user challenge should be issued, such as using the approaches described herein.

In other embodiments, the risk assessment analysis of block 410 may be based on a geographic location associated with request received at block 405. In like fashion as previously described, a geographic location associated with the request of block 405 may be determined using the IP geocoding module 138 based on an IP address included in the request of block 405. If the IP address associated with the request of block 405 corresponds with a geography known for having a large amount of fraudulent online activity (e.g., and the legitimate user associated with the received login credentials does not typically login in from that area), the risk assessment analysis of block 410 may indicate that there is a risk that the request of block 405 is fraudulent and that a user challenge should be issued.

In still other embodiments, the risk assessment analysis of block 410 may be based on respective times and geographic locations of requests received by the online service provider 130 that are associated with a given set of login credentials. For example, if a request to access an online service 132 of the online service provider 130 using the given set of login credential is received from Mountain View, Calif. (e.g., based on IP geocoding) at one o'clock in the afternoon (Pacific Time) and then another request to access an online service 132 of the online service provider 130 is received from a location in Europe (e.g., based on IP geocoding) using the given user credentials at three o'clock the same afternoon (Pacific Time), this may indicate that there is a risk of fraudulent activity (e.g., because of the short time difference between the requests and the large geographic distance between the two locations). In this situation, the risk assessment analysis of block 410 may indicate that a user challenge should be issued. Of course, a number of other approaches for performing the risk assessment analysis of block 410 are possible and the foregoing approaches are provided by way of example.

In the method 400, at block 415, if the risk assessment analysis of block 410 determines that the request does not include one or more attributes indicating that the request is potentially fraudulent, the method 400 may proceed to block 420 and the request of block 405 may be granted. If, however, the risk assessment analysis of block 410 determines that the request does include one or more attributes indicating the request is potentially fraudulent, the method 400, at block 415, may proceed with a user challenge that may implemented using the operations of blocks 425, 430, 435, 440, 445 and 450.

In the method 400, blocks 425-450 include substantially the same operations as blocks 340, 350, 360, 370, 380 and 390 and may be implemented using the same techniques as discussed above with respect to FIGS. 1-3. Accordingly, for purposes of brevity and clarity, the operation of blocks 340-390 (with respect to blocks 425-450) will not be described in detail again here.

Figure 5:
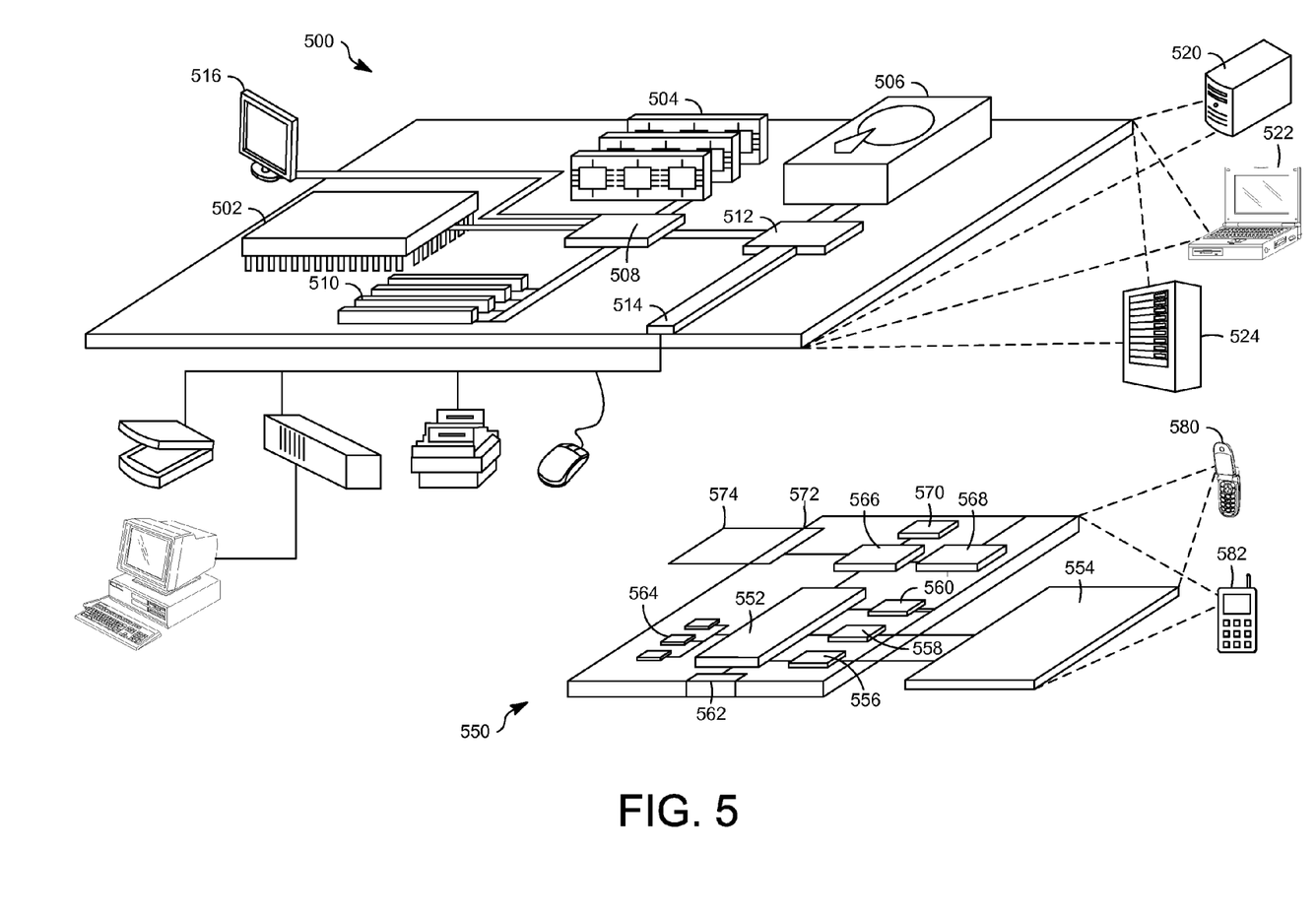
FIG. 5 is a diagram that illustrates a computing device and a mobile computing device that can be used to implement the techniques described herein in accordance with an example embodiment.

FIG. 5 is a diagram that shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 584 may also be provided and connected to device 550 through expansion interface 582, which may include, for example, a SIMM (Single In Line Memory Module) card interface. Such expansion memory 584 may provide extra storage space for device 550, or may also store applications or other information for device 550. Specifically, expansion memory 584 may include instructions to carry out or supplement the processes described above, and may include secure information also. Thus, for example, expansion memory 584 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 584, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 580 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
    receiving, at a server, a request to access an online service provided by the server, the request including a set of login credentials;
    verifying that the login credentials are valid;
    providing instructions for a challenge to a user that provided the login credentials including a graphical user interface (GUI) including a map image,
        the graphical user interface being configured to allow the user to reposition and resize the map image,
        the challenge instructions requesting that the user identify and provide an indication of a geographic location of a previous successful login associated with the login credentials including providing an indication of map image boundaries selected by the user and a map center point corresponding with the selected map image boundaries, and
        the challenge instructions providing information to the user regarding threshold criteria that will be used to determine if the challenge is satisfied, the information indicating that the map center point be within a threshold distance of the geographic location of the previous successful login;
    receiving a response to the challenge, the response including the indication of the identified geographic location;
    determining if the challenge is satisfied by determining, using the threshold criteria, if the identified geographic location is within the threshold distance of the geographic location of the previous successful login associated with the login credentials;
    if the challenge is satisfied, granting the request; and
    if the challenge is not satisfied, denying the request.

2. The computer-implemented method of claim 1, wherein determining if the identified geographic location is within the threshold distance of the geographic location of the previous successful login comprises determining if the map center point corresponding with the received map image boundaries is within the threshold distance of the geographic location of the previous successful login.

3. The computer-implemented method of claim 1, wherein determining if the challenge is satisfied further comprises determining if an area defined by the map image boundaries is below a threshold size.

4. The computer-implemented method of claim 1, wherein the graphical user interface is further configured to allow the user to reposition the map image by providing at least one of an address, a city name, a state name, a province name, a country name and a landmark name.

5. The computer-implemented method of claim 4, wherein the graphical user interface is further configured to receive the at least one of an address, a city name, a state name, a province name, a country name and a landmark name as text input.

6. The computer-implemented method of claim 1, wherein the graphical user interface is further configured to allow the user to provide an indication of a geographic location by placing a marker on the map image.

7. The computer-implemented method of claim 6, wherein the graphical user interface is further configured to reposition the map image using the marker as a center point.

8. The computer-implemented method of claim 6, wherein the graphical user interface is further configured to allow the user to move the marker after placing the marker on the map image.

9. The computer-implemented method of claim 1, wherein the graphical user interface is further configured to allow the user to resize the map image by zooming-in on the map image and zooming-out on the map image.

10. The computer-implemented method of claim 1, wherein the threshold distance depends on the geographic location of the previous successful login.

11. The computer-implemented method of claim 1, wherein requesting that the user identify and provide an indication of the geographic location of the previous successful login comprises requesting that the user identify and provide an indication of a geographic location of a last successful login.

12. The computer-implemented method of claim 1, wherein requesting that the user identify and provide an indication of the geographic location of the previous successful login comprises requesting that the user identify one of a predetermined number of previous successful login attempts, the predetermined number being greater than one.

13. The computer-implemented method of claim 1, wherein the server is configured to determine geographic locations based on Internet Protocol (IP) geocoding.

14. A computer-implemented method comprising:
    receiving, at a server, a request to access an online service provided by the server, the request including a set of valid login credentials;
    providing instructions for a challenge to a user that provided the login credentials including a graphical user interface (GUI) including a map image,
        the graphical user interface being configured to allow the user to reposition and resize the map image,
        the challenge instructions requesting that the user identify and provide an indication of a geographic location of a previous successful login associated with the login credentials including providing an indication of map image boundaries selected by the user, and
        the challenge instructions providing information to the user regarding threshold criteria that will be used to determine if the challenge is satisfied, the information indicating that the map image boundaries selected by the user be equal to or less than a threshold size;
    receiving a response to the challenge, the response including the indication of the identified geographic location;
    determining if the challenge is satisfied by determining, using the threshold criteria, if the identified geographic location is within a threshold distance of the geographic location of the previous successful login associated with the login credentials;
    if the challenge is satisfied, granting the request; and
    if the challenge is not satisfied, denying the request.

15. The computer-implemented method of claim 14,
    wherein the threshold criteria includes map image boundaries of the threshold size, and
    wherein determining if the identified geographic location is within the threshold distance further comprises:
        determining if the selected map image boundaries are equal to or less than the threshold size; and
        responsive to determining that the selected map image boundaries are equal to or less than the threshold size, determining if the geographic location of the previous successful login is within the selected map image boundaries.

16. The computer-implemented method of claim 14, wherein requesting that the user identify and provide an indication of the geographic location of the previous successful login comprises requesting that the user identify one of a predetermined number of previous successful login attempts, the predetermined number being greater than one.

17. The computer-implemented method of claim 14, further comprising:
performing, by the server, a risk assessment analysis of the request, the risk assessment analysis determining that the request includes one or more attributes indicating the request is potentially fraudulent.

18. The computer-implemented method of claim 17, wherein the risk assessment analysis is based on at least one of:
an Internet Protocol (IP) address associated with the request;
a geographic location associated with the request; and
a distance between the geographic location associated with the request and a geographic location of a last successful login associated with the login credentials, and an elapsed time between the request and the last successful login.

19. The computer-implemented method of claim 18, wherein the geographic location of the request and the geographic location of the last successful login attempt are determined using Internet Protocol geocoding.

20. A non-transitory computer-readable medium having recorded and stored thereon instructions that, when executed by a computing device, cause the computing device to perform the actions of:
receiving, at a server, a request to access an online service provided by the server, the request including a set of login credentials;
verifying that the login credentials are valid;
providing instructions for a challenge to a user that provided the login credentials including a graphical user interface (GUI) including a map image,
the graphical user interface being configured to allow the user to reposition and resize the map image,
the challenge instructions requesting that the user identify and provide an indication of a geographic location of a previous successful login associated with the login credentials including providing an indication of map image boundaries selected by the user and a map center point corresponding with the selected map image boundaries, and
the challenge instructions providing information to the user regarding threshold criteria that will be used to determine if the challenge is satisfied, the information indicating that the map center point be within a threshold distance of the geographic location of the previous successful login;
receiving a response to the challenge, the response including the indication of the identified geographic location;
determining if the challenge is satisfied by determining, using the threshold criteria, if the identified geographic location is within the threshold distance of the geographic location of the previous successful login associated with the login credentials;
if the challenge is satisfied, granting the request; and
if the challenge is not satisfied, denying the request.

21. A non-transitory computer-readable medium having recorded and stored thereon instructions that, when executed by a computing device, cause the computing device to perform the actions of:
receiving, at a server, a request to access an online service provided by the server, the request including a set of valid login credentials;
providing instructions for a challenge to a user that provided the login credentials including a graphical user interface (GUI) including a map image,
the graphical user interface being configured to allow the user to reposition and resize the map image,
the challenge instructions requesting that the user identify and provide an indication of a geographic location of a previous successful login associated with the login credentials including providing an indication of map image boundaries selected by the user, and
the challenge instructions providing information to the user regarding threshold criteria that will be used to determine if the challenge is satisfied, the information indicating that the map image boundaries selected by the user be equal to or less than a threshold size;
receiving a response to the challenge, the response including the indication of the identified geographic location;
determining if the challenge is satisfied by determining, using the threshold criteria, if the identified geographic location is within a threshold distance of the geographic location of the previous successful login associated with the login credentials;
if the challenge is satisfied, granting the request; and
if the challenge is not satisfied, denying the request.

22. The computer-readable medium of claim 21, further including instructions that, when executed by the computing device, further cause the computing device to perform the action of:
performing, by the server, a risk assessment analysis of the request, the risk assessment analysis determining that the request includes one or more attributes indicating the request is potentially fraudulent.

* * * * *